US005524229A

United States Patent [19]

Nozaki

[11] Patent Number: 5,524,229
[45] Date of Patent: Jun. 4, 1996

[54] ADDRESS GENERATING CIRCUIT AND CD-ROM DEVICE USING THE SAME

[75] Inventor: Minoru Nozaki, Kanagawa, Japan

[73] Assignee: NEC Corporation, Tokyo, Japan

[21] Appl. No.: 414,044

[22] Filed: Mar. 30, 1995

Related U.S. Application Data

[63] Continuation of Ser. No. 794,147, Nov. 19, 1991, abandoned.

[30] Foreign Application Priority Data

Nov. 19, 1990 [JP] Japan ................... 2-314731

[51] Int. Cl.⁶ ........................ G06F 12/02; G06F 11/08
[52] U.S. Cl. .............. 395/421.07; 395/404; 395/421.09; 395/421.1; 395/182.04; 371/37.4; 371/40.1; 364/DIG. 1; 364/DIG. 2
[58] Field of Search ................... 395/425, 400, 395/421.07, 421.09, 421.10, 429, 404, 182.04; 371/37.4, 37.5, 40.1, 37.8

[56] References Cited

U.S. PATENT DOCUMENTS

| | | | |
|---|---|---|---|
| 4,133,041 | 2/1979 | Kashio | 395/425 |
| 4,680,764 | 7/1987 | Suzuki et al. | 371/40 |
| 4,868,789 | 9/1989 | MacDonald | 365/200 |
| 4,901,318 | 2/1990 | Tomisawa | 371/40.1 |
| 5,060,221 | 10/1991 | Sako et al. | 369/59 |
| 5,257,271 | 10/1993 | Lagadec et al. | 371/37.4 |
| 5,347,640 | 9/1994 | You | 395/400 |

Primary Examiner—Eddie P. Chan
Assistant Examiner—Reginald G. Bragdon

[57] ABSTRACT

An address generating circuit for accessing a RAM for a CD-ROM device includes line and column counters for counting lines and columns of addresses in the RAM. The address generating circuit also has a memory unit for storing a part of storage addresses of the RAM. The line counter produces a line count value and updates the same. The column counter produces a column count value and updates the same. An accessing unit is coupled to the line counter and the memory unit for accessing the memory unit in response to the line count value to thereby read out a different one of the part of storage addresses stored in the memory unit each time the line count value is updated. An adding unit is coupled to the memory unit and the column counter for adding the column count value to a storage address read out from the memory unit to generate an access address, which is being changed each time the line count value or the column count value is updated to access each of the storage addresses of the RAM.

9 Claims, 5 Drawing Sheets

FIG. 4

| LINE COUNTER 1 | COLUMN COUNTER 2 | ARITHMETIC LOGIC UNIT | ROM ADDRESS GEN | ROM 5 | ARITHMETIC LOGIC UNIT | |
|---|---|---|---|---|---|---|
| 0 | 0 | 0 | 0 | 0000 | 0000 | |
| 0 | 1 | 1 | 1 | 0043 | 0044 | |
| 0 | 2 | 2 | 2 | 0086 | 0088 | |
| --- | --- | --- | --- | --- | --- | |
| 0 | 24 | 24 | 24 | 1032 | 1056 | |
| 0 | 25 | 25 | 25 | 1075 | 1100 | |
| 0 | 26 | 26 | 0 | 0000 | 0026 | * OUTPUT OF MODULATOR 4 CHANGES TO "0" (MOD25) |
| 0 | 27 | 27 | 1 | 0043 | 0070 | |
| --- | --- | --- | --- | --- | --- | |
| 0 | 41 | 41 | 15 | 0645 | 0686 | |
| 0 | 42 | 42 | 16 | 0688 | 0730 | |
| 0 | 43 | - | - | --- | --- | ⎤ Q-PARITY |
| 0 | 44 | - | - | --- | --- | ⎦ → LINE COUNTER 1 COUNTS UP |
| 1 | 0 | 1 | 1 | 0043 | 0043 | |
| 1 | 1 | 2 | 2 | 0086 | 0087 | |
| 1 | 2 | 3 | 3 | 0129 | 0131 | |
| 1 | 3 | 4 | 4 | 0172 | 0175 | |
| 1 | 4 | 5 | 5 | 0215 | 0219 | |
| --- | --- | --- | --- | --- | --- | |

FIG. 5

| LINE COUNTER 1 | COLUMN COUNTER 2 | ROM 5 | ARITHMETIC LOGIC UNIT | |
|---|---|---|---|---|
| 0 | 0 | 0000 | 0000 | |
| 1 | 0 | 0043 | 0043 | |
| 2 | 0 | 0086 | 0086 | |
| 3 | 0 | 0129 | 0129 | |
| --- | --- | --- | --- | |
| 24 | 0 | 1032 | 1032 | |
| 25 | 0 | 1075 | 1075 | |
| 0 | 1 | 0000 | 0001 | ← COLUMN COUNTER 2 COUNTS UP |
| 1 | 1 | 0043 | 0044 | |
| 2 | 1 | 0086 | 0087 | |
| --- | --- | --- | --- | |

ADDRESS GENERATING CIRCUIT AND CD-ROM DEVICE USING THE SAME

This is a continuation of application Ser. No. 07/794,147 filed Nov. 19, 1991 now abandoned.

FIELD OF THE INVENTION

This invention relates to an address generating circuit and a compact disk read only memory (CD-ROM) device using the same, and more particularly to, an address generating circuit which generates an address of a memory in case of error correction and a CD-ROM device using the same.

BACKGROUND OF THE INVENTION

A conventional CD-ROM device includes a central processing unit (CPU), processing unit and a random access memory (RAM).

In error correction of data transferred from a CD-ROM to the RAM, the signal processing unit supplies the CPU with an error correction process starting signal. The CPU supplies the signal processing unit with an address signal calculated in accordance with the error correction process starting signal. The signal processing unit supplies the RAM with the calculated address signal as a RAM address signal, at which stored data are corrected in the RAM.

According to a conventional address generating circuit, however, there is a disadvantage in that many steps are required to generate addresses, because the RA address signal is supplied from the signal processing unit as a result of logic calculations by the CPU. Therefore, the probability of correcting a data error may remain low. Further, the CPU can not preform properly, because the CPU is burdened with heavy loads including generating addresses in accordance with a logic calculation.

SUMMARY OF THE INVENTION

Accordingly, it is an object of the invention to provide an address generating circuit in which the probability of data error correction is high, and to provide a CD-ROM device using the same.

It is another object of the invention to provide an address generating circuit in which the load an a CPU is reduced, and to provide a CD-ROM device using the same.

According to a first feature of the invention, an address generating circuit comprises:

- a line counter for counting lines of addresses of a RAM, said RAM addresses being defined by line and column coordinates;
- a column counter for counting column addresses of the RAM:
- a first logic circuit for making a sum of outputs of the line and column counters;
- an address generator for operating on the output of the logic circuit;
- a first selector for selecting an output from outputs of the line and column counters and the modulator;
- a ROM in which start addresses of the lines of addresses are stored:
- second selector for selecting an output from outputs of the line and column counters; and
- a second logic circuit for making a sum of outputs of the ROM and the second selector to be supplied to the RAM as an address.

According to a second feature of the invention, a CD-ROM device comprises:

- RAM for storing data to be read from a CD-ROM;
- a CPU for controlling operation of reading data from the CD-ROM; and
- a signal processing unit for processing signals between the RAM and the CPU, the signal processing unit comprising an address generating circuit which comprises a line counter for counting a line number of addresses of a RAM, a column counter for counting a column number of addresses of the RAM, a first logic circuit for making a sum of outputs of the line and column counters, a modulator for modulating an output of the logic circuit, a first selector for selecting an output from outputs of the line and column counters and the modulator, a ROM in which start addresses of the lines of addresses are stored, a second selector for selecting an output from outputs of the line and column counters, and a second logic circuit for making a sum of outputs of the ROM and the second selector to be supplied to the RAM as an address.

BRIEF DESCRIPTION OF THE DRAWINGS

The invention will be explained in more detail in conjunction with appended drawings wherein:

FIG. 4 is a list showing contents of elements of the address generating circuit in case of generating Q-system addresses; and FIG. 5 is a list showing contents of elements of the address generating circuit in case of generating P-system addresses.

DESCRIPTION OF THE PREFERRED EMBODIMENTS

Figure 1:
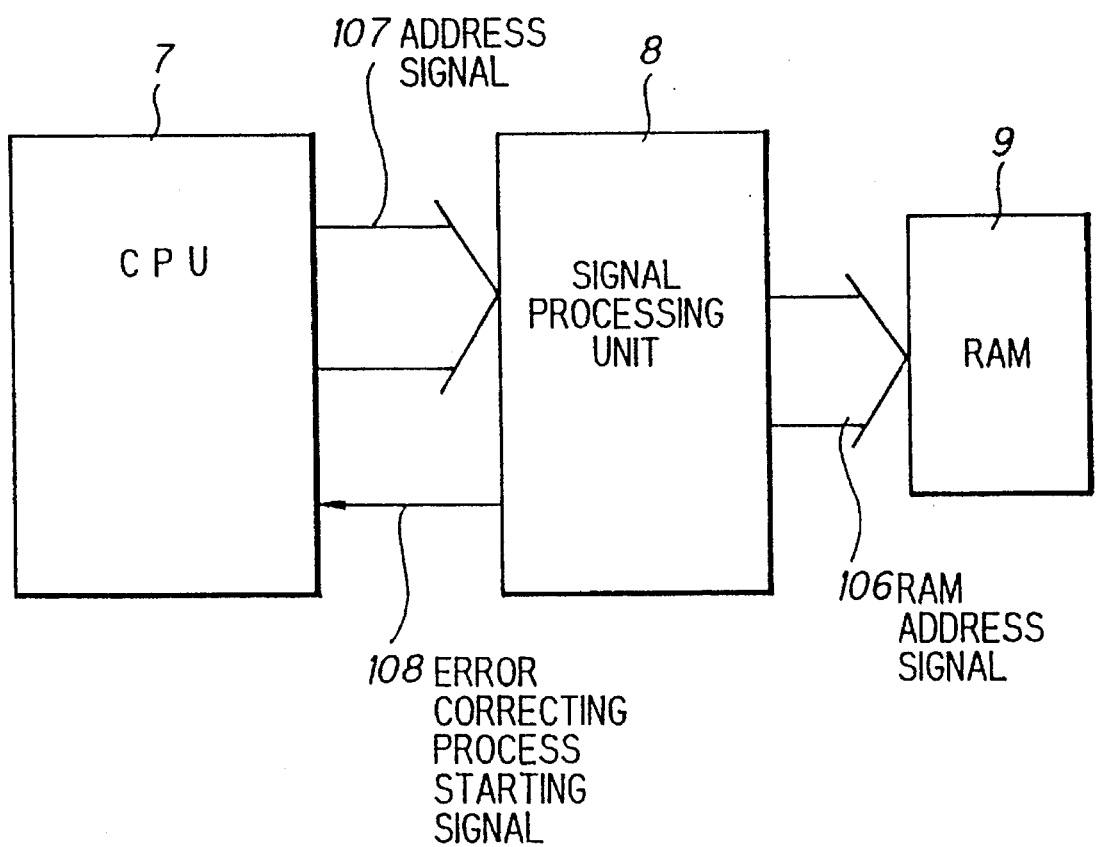
FIG. 1 is a block schematic diagram of a conventional CD-ROM device.

Before describing an address generating circuit and a CD-ROM device in a preferred embodiment according to the invention, the conventional address generating circuit described before will be explained in conjunction with FIG. 1.

A conventional CD-ROM device includes a CPU 7, a signal processing unit 8 and a RAM 9. The RAM 9 is filled with data read from a CD-ROM device (not shown). The stored data is processed in the signal processing unit 8. In this operation, error data may have been stored in the RAM 9. In such a case, the error data should be corrected with as high probability as possible. For this purpose, an address of RAM 9 in which the error data is stored must be generated in address signal generating circuit. In the CD-ROM device, the RAM address signal is supplied from the signal processing unit 8 as a result of logical calculation process by the CPU 7, as explained before, so that the probability of error data correction is relatively small, and the CPU 7 is burdened with heavy loads including such address generation.

Figure 2:
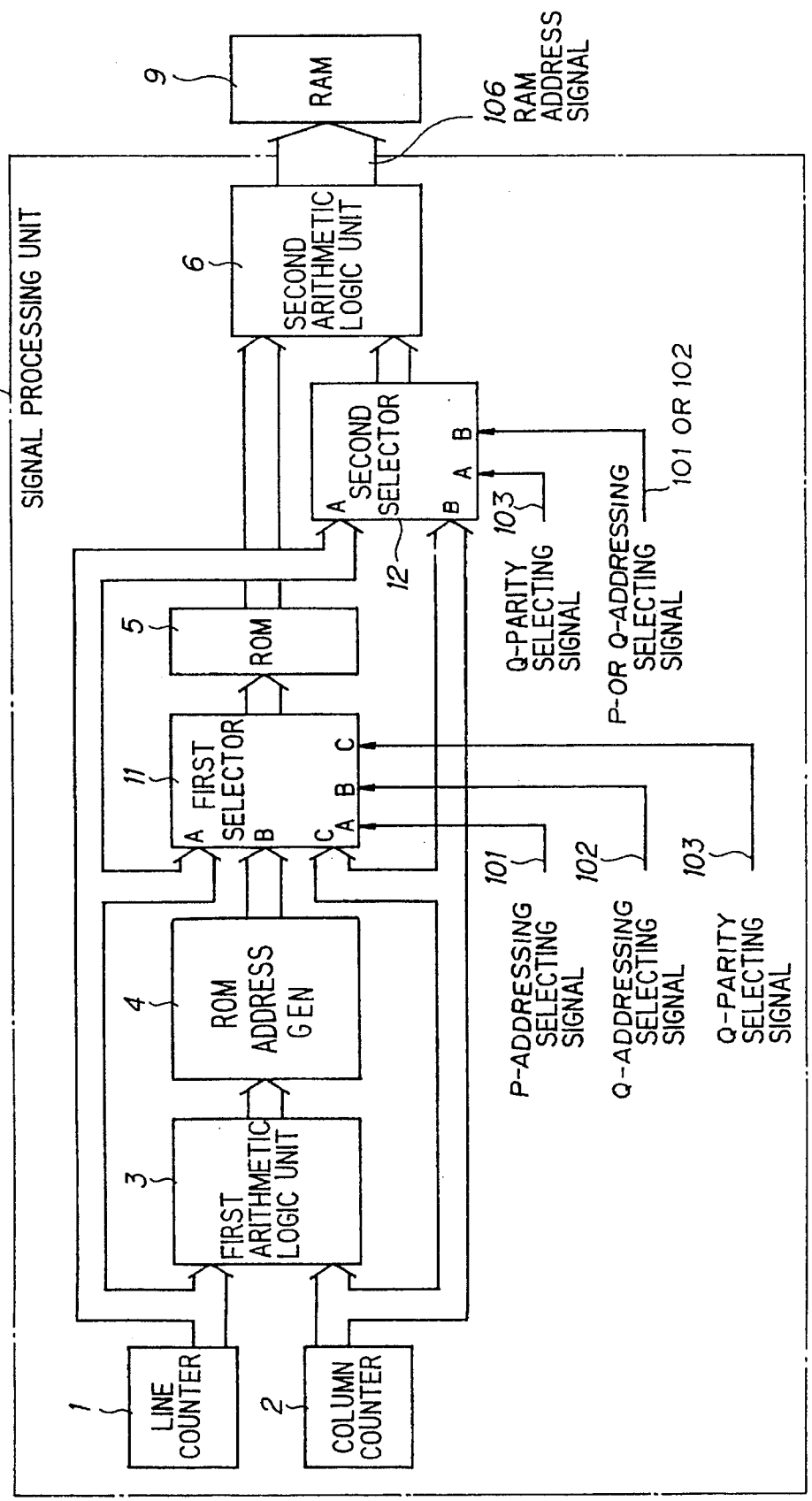
FIG. 2 is a block schematic diagram of a signal processing unit of a CD-ROM device including an address generating circuit in a preferred embodiment according to the invention.

Next, an address generating circuit in a preferred embodiment according to the invention will be explained. FIG. 2 shows an address generating circuit in a preferred embodiment. The address generating circuit includes a line counter 1 which counts line values, a column counter 2 which counts column values thereof, a first arithmetic logic unit 3 which makes a sum of outputs of the line and column counters 1 and 2, a ROM address generator 4 which operates on the output of the first arithmetic logic unit 3, a first selector 11 which selects an output from outputs of the line and column counters 1 and 2 and the address generator 4 in accordance with P- and Q-addressing selecting signals 101 and 102 and a Q-parity selecting signal 103, a ROM 5 which stores start addresses of the address lines and supplies an output in correspondence with an output of the first selector 11, a second selector 12 Which selects an output from outputs of the line and column counters 1 and 2 and the ROM 5 in correspondence with a Q-parity selecting signal 103 and P-OR-Q addressing selecting signal 101 or 102, and a second arithmetic logic-unit 6 which makes a sum of outputs of the ROM 5 and the second selector 12. The ROM address generator 4 generates an output signal of 0 to 25 corresponding to an input signal supplied from the first arithmetic logic unit 8, as indicated in the below Table I.

TABLE I

| INPUT SIGNAL | OUTPUT SIGNAL |
| --- | --- |
| 0–25 | 0–25 |
| 26–51 | 0–25 |
| 52–77 | 0–25 |
| . | . |
| . | . |

Figure 3:
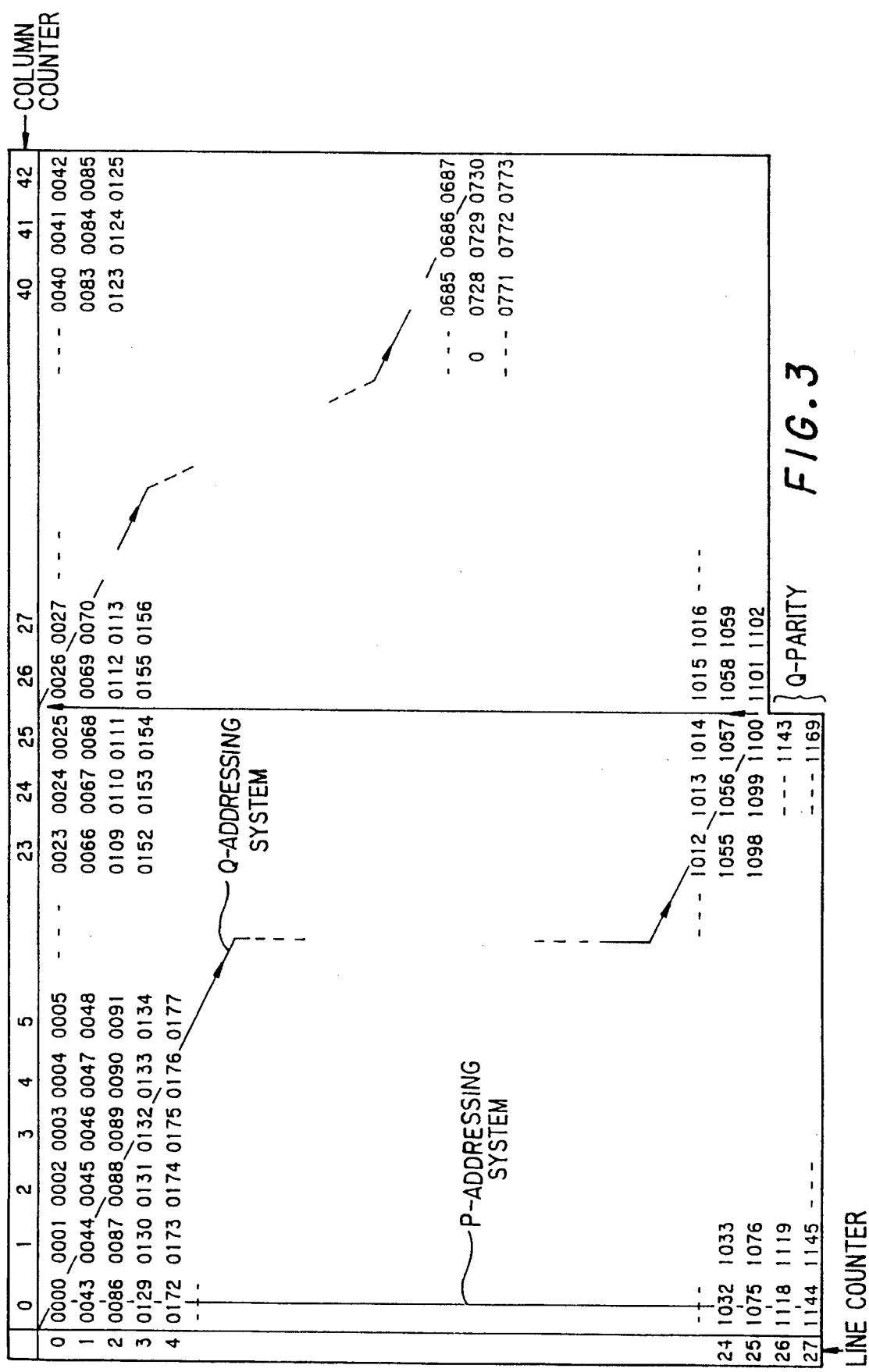
FIG. 3 is an address map showing addresses, of a RAM generated by the address generating circuit in the preferred embodiment according to the invention.

The ROM 5 stores a start address "0000", "0043", "0086", . . . of each line in the RAM 9 at a counted number of "0" of the column counter 1, as illustrated in an address map of the RAM 9 shown in FIG. 3, in which Q- and P-addressing systems of address generation are indicated by arrows.

Next, operation of the address generating circuit will be explained in conjunction with FIGS. 3 to 5. First, the operation of generating addresses of a Q-addressing system will be explained in conjunction with FIG. 4. In operation, the first arithmetic logic unit 3 makes a sum of outputs of the line and column counters 1 and 2. The ROM address generator 4 generates a number based on the output of the first arithmetic logic unit 3. When its input is "26", then the address generator 4 outputs "0", and increases the number again from zero, i.e., 0,1,2 . . . out. When the column value of the column counter 2 becomes "48" or "44", these values are identified as Q-parities, so that predetermined addresses of "1118" and "1144" are designated in the ROM 5. Then, the column values output of the column counter 2 is set to be "0". The first selector 11 selects the output of the address generator 4 in response to the Q-addressing system selecting signal 101 which is supplied to the ROM 5 when the column value of the address column is not more than "42". The ROM 5 supplies the start address of the address lines, the addresses to be supplied to the second arithmetic logic unit 6. On the other hand, the second selector 12 selects an output of the column counter 2 in correspondence with the P-OR-Q-addressing selecting signal 101 or 102 to be supplied to the second arithmetic logic unit 6. The second arithmetic logic unit 6 makes a sum of the start address read from the ROM 5 and the counted values of the column counter 2, the sum to be supplied to the RAM 9 as the RAM address signal 106. When the counted value of the column counter 2 is "43" or "44", then the first selector 11 selects the output of the column counter 2 to be supplied to the ROM 5 in correspondence with the Q-parity selecting signal 103, so that the ROM 5 supplies the addresses of "1118" or "1144" to the second arithmetic logic unit 6, respectively. The second selector 12 selects the output of the line counter 1 to be input to the second arithmetic logic unit 6 in correspondence with the Q-parity selecting signal 103. The second arithmetic logic unit 6 makes a sum of the predetermined address of "1118" or "1144" and the counted number of the line counter 1 to be supplied to the RAM 9 as the RAM address signal 106.

Next, the operation of generating addresses of a P-addressing system will be explained in conjunction with FIG. 5. In operation, the first selector 11 selects the output of the line counter 1 in accordance with the P-addressing system selecting signal 101 supplied to the ROM 5 when the column number of the address column is at most "42". The ROM 5 supplies the start address of the address lines to be supplied to the second arithmetic logic unit 6. On the other hand, the second selector 12 selects an output of the column counter 2, in correspondence with the P-OR-Q-addressing selecting signal 101 or 102, to be supplied to the second arithmetic logic unit 6. The second arithmetic logic unit 6 makes a sum of the start address read from the ROM 5 and the counted value of the column counter 2, the sum to be supplied to the RAM 9 as the RAM address signal 106.

When the counted value of the column counter 2 is "43" or "44", then the first selector 11 selects the output of the column:counter 2 to be supplied to the ROM 5 in correspondence with the Q-parity selecting signal 103, so that the ROM 5 supplies the addresses of "1118" or "1144" to the second arithmetic logic unit 6, respectively. The second selector 12 selects the output of the line counter 1 to be supplied to the second arithmetic logic unit 6 in accordance with the Q-parity selecting signal 103. The second arithmetic logic unit 6 makes a sum of the predetermined address of "1118" or "1144" and the line number of the address line, the sum to be supplied to the RAM 9 as the RAM address signal 106.

In a CD-ROM device, the signal processing unit 8 includes the address generating circuit as explained above, so that the RAM address signal 106 is directly supplied to the RAM 9 from the signal processing unit 8 without using the CPU. Therefore, fewer steps are required to generate addresses than those required in the conventional CD-ROM device, so that the probability of the error correction increases. Further, the load of the CPU is reduced, so that the CPU can to perform properly.

Although the invention has been described with respect to a specific embodiment for complete and clear disclosure, the appended claims are not to be thus limited, and alternative constructions that may occur to one skilled in the art fairly fall within the basic teaching herein set forth.

What is claimed is:

1. An address generating circuit for a memory having a plurality of storage addresses to generate an access address for accessing each of said storage addresses of said memory, the address generating circuit comprising:

storage means for storing some of said plurality of storage addresses of said memory;

a line counter for producing a line count value and updating said line count value;

a column counter for producing a column count value and updating said column count value;

means, coupled to said line counter and said storage means, for accessing said storage means in response to said line count value to thereby read out a different one of said some of said plurality of storage addresses from said storage means each time said line count value is updated; and means, coupled to said storage means and said column counter, for adding said column count value to a storage address read out from said storage means to generate said access address, said access address being thereby changed each time at least one of said line count value and said column count value is updated to access each of said storage addresses of said memory.

2. The circuit as claimed in claim 1, wherein said line counter updates said line count value at a first rate and said column counter updates said column count value at a second rate which is lower than said first rate.

3. An address generating circuit for a memory having a plurality of storage addresses for generating an access address for accessing each of said storage addresses of said memory, the address generating circuit comprising:

a line counter for producing a line count value and updating said line count value;

a column counter for producing a column count value and updating said column count value;

means for storing some of said plurality of storage addresses of said memory;

means, responsive to a modulation value dependent on a sum of said line count value and said column count value to access said storing means, for reading out one storage address from said storing means each time at least one of said line count value and said column count value is updated; and means, coupled to said storing means and said column counter, for adding said column count value to said one storage address to generate said access address, said access address being changed said each time.

4. The circuit as defined in claim 3, wherein said line counter updates said line count value at a first rate, said said column counter updates said column count value at a second rate which is higher than said first rate.

5. The circuit as defined in claim 3, wherein said reading-out means comprises:

means for adding said line count value to said column count to provide said sum;

means for modulating said sum to provide said modulation value, a maximum value of said modulation value being less than a maximum value of said column count value, wherein said modulation value is equal to said sum when said sum is less than or equal to said maximum value of said modulation value, and said modulation value is incremented from a minimum value thereof to said maximum value thereof, periodically, as said sum is incremented, when said sum is greater than said maximum value of said modulation value; and means for accessing said storing means to read out said one storage address upon receiving said modulation value.

6. An address generating circuit for a memory having a plurality of storage addresses for generating an access address for accessing each of said storage addresses of said memory, the address generating circuit comprising:

a line counter for producing a line count value and updating said line count value;

a column counter for producing a column count value and updating said column count value;

means for storing some of said plurality of storage addresses of said memory;

means for supplying P- and Q-addressing signals;

means for receiving said P- and Q-addressing signals and being responsive to said line count value when said P-addressing signal is supplied, and responsive to a modulation value dependent on a sum of said line count value and said column count value, when said Q-addressing signal is supplied, respectively, to access said storing means, for reading out one storage address of said some of said plurality of storage addresses from said storing means each time at least one of said line count value and said column count value is updated; and means, coupled to said storing means and said column counter, for adding said column count value to said one storage address to generate said access address, said access address being changed said each time.

7. The circuit as defined in claim 6, wherein said line counter updates said line count value at a first rate, and said column counter updates said column count value at a second rate which is lower than said first rate when said P-addressing signal is supplied, and said line counter updates said line count value at a third rate, and said column counter updates said column count value at a fourth rate which is higher than said third rate when said Q-addressing signal is supplied.

8. An address generating circuit for a memory having a plurality of storage addresses for generating an access address for accessing each of said storage addresses of said memory, the address generating circuit comprising:

a line counter for producing a line count value and updating said line count value;

a column counter for producing a column count value and updating said column count value;

first means for storing some of said plurality of storage addresses of said memory;

second means for supplying P- and Q-addressing signals and Q-parity signals;

third means for receiving said P- and Q-addressing signals and Q-parity signals and being responsive to said line count value when said P-addressing signal is supplied, responsive to a modulation value dependent on a sum of said line count value and said column count value when said Q-addressing signal is supplied, and responsive to said column count value when said Q-parity signal is supplied, respectively, to access said storing means, for reading out one storage address of said some of said plurality of storage addresses from said storing means each time at least one of said line count value and said column count value is updated; and forth means for receiving one of said P- and Q-addressing signals and said Q-parity signal and coupled to said storing means and said column counter, when one of said P- and Q-addressing signals is supplied, for adding said column count value to said one storage address, and couple to said storing means and said line counter, when said Q-parity signal is supplied, for adding said line count value to said one storage address, respectively, to generate said access address, said access address being changed said each time.

9. The circuit as defined in claim 8, wherein said line counter updates said line count value at a first rate, and said column counter updates said column count value at a second rate which is lower than said first rate when said P-addressing signal is supplied; and said line counter updates said line count value at a third rate, and said column counter updates said column count value at a fourth rate which is higher than said third rate when one of said Q-addressing signal and said Q-parity signal is supplied.

* * * * *